United States Patent
Arinero et al.

(10) Patent No.: US 8,981,308 B2
(45) Date of Patent: Mar. 17, 2015

(54) MEASUREMENT OF RADIATIONS OF HIGH INFLUENCE BY A CAPACITIVE ELEMENT OF MOS TYPE

(75) Inventors: Richard Arinero, Montpellier (FR); Julien Mekki, Montpellier (FR); Antoine Touboul, Grabels (FR); Frederic Saigne, Montpellier (FR); Jean-Roch Vaille, Sardan (FR)

(73) Assignee: Universite Montpellier 2 Sciences et Techniques, Montpellier (FR)

( * ) Notice: Subject to any disclaimer, the term of this patent is extended or adjusted under 35 U.S.C. 154(b) by 0 days.

(21) Appl. No.: 13/982,586

(22) PCT Filed: Jan. 31, 2012

(86) PCT No.: PCT/FR2012/000040
§ 371 (c)(1),
(2), (4) Date: Oct. 11, 2013

(87) PCT Pub. No.: WO2012/104505
PCT Pub. Date: Aug. 9, 2012

(65) Prior Publication Data
US 2014/0034841 A1    Feb. 6, 2014

(30) Foreign Application Priority Data

Feb. 1, 2011 (FR) ................................. 11 00303

(51) Int. Cl.
*G01T 1/02*    (2006.01)

(52) U.S. Cl.
CPC ...................... *G01T 1/026* (2013.01)
USPC ....................................... 250/370.07

(58) Field of Classification Search
CPC .................................. G01T 1/026; G01T 1/24
USPC ....................................... 250/370.07
See application file for complete search history.

(56) References Cited

U.S. PATENT DOCUMENTS

| | | |
|---|---|---|
| 4,529,884 A | 7/1985 | Wolicki et al. |
| 2011/0003279 A1* | 1/2011 | Patel .................................. 435/5 |

OTHER PUBLICATIONS

Estrada Del Cueto; "Note on the Analysis of C-V Curves for High Resistivity Substrates;" Solid-State Electronics; Apr. 1996; vol. 39, No. 10; pp. 1519-1521.
Fleta et al.; "High-energy proton irradiation effects on tunneling MOS capacitors;" Microelectronic Engineering; 2004; vol. 72; pp. 85-89.
Xapsos et al.; "Charge Collection Efficiency Related to Damage in MOS Capacitors;" IEEE Transactions on Nuclear Science; Dec. 1987; vol. NS-34; pp. 1214-1219.
Amir et al.; "The Mechanism of Mosfet Damage Induced by Neutron Radiation Resulting from D-T Fusion Reaction;" Gadjah Mada University; May 2002; pp. 1-15.
Messenger et al.; "Displacement Damage in MOS Transistors;" IEEE Transactions on Nuclear Science; Oct. 1965; vol. 12, No. 5; pp. 78-82.
May 10, 2012 International Search Report issued in International Application No. PCT/FR2012/000040.

* cited by examiner

*Primary Examiner* — Marcus Taningco
(74) *Attorney, Agent, or Firm* — Oliff PLC

(57) ABSTRACT

A method for measuring a dose related to the non-ionizing effects of a radiation of particles comprises the irradiation of a capacitive element provided with an electrode made from a semiconductor material, the measurement of the capacitance of the capacitive element in an accumulation regime and the determination of the dose related to the non-ionizing effects from the measurement of capacitance of the capacitive element in the accumulation regime.

2 Claims, 2 Drawing Sheets

MEASUREMENT OF RADIATIONS OF HIGH INFLUENCE BY A CAPACITIVE ELEMENT OF MOS TYPE

BACKGROUND OF THE INVENTION

The invention relates to the dosimetry of a particle radiation, and more specifically to the dosimetry of a high-fluence non-ionizing radiation.

State of the Art

In a space environment, electronic systems are submitted to a radiation of particles mainly formed of protons and of electrons. Such a radiation causes a degradation of electronic system performances. This sensitivity to radiations tends to be enhanced by the miniaturization of electronic components.

Certain terrestrial applications also generate a constraining radiation environment for electronic systems, such as at the Large Hadron Collider, LHC, of the Centre Européen de la Recherche Nucléaire (CERN).

Three types of electronic component failures in a radiation environment can be distinguished: ionizing dose effects, single event effects, and non-ionizing dose effects.

The ionizing radiation causes the creation and the trapping of electric charges (ions) in the materials of electronic components. Single Event Effects (SEE) are characterized by a local ionization caused by a single particle. Finally, non-ionizing dose effects are related to displacements of atoms in semiconductor materials, due to collisions of the particles with the crystal lattice nuclei.

The radiation dose can be expressed by a fluence, that is, a particle flow over a given time period. By convention, the fluence of a certain type of particles is converted into an equivalent fluence of neutrons having a 1-MeV energy. This enables to compare the degradation caused by particles of different natures. At the LHC, the equivalent fluence over a 10-year period varies between $10^9$ and $10^{15}$ $n_{eq}/cm^2$ (neutrons at 1 MeV per $cm^2$).

To assess the degradation of electronic circuits, it is desired to measure the radiation dose accumulated in the components. Current dosimeters are formed of silicon PIN diodes.

The PIN diode is forward biased after having been exposed to radiation. A current pulse, having an amplitude equal to 1 mA and a duration ranging between 100 ms and 700 ms, is generally applied, after which the voltage across the diode is measured. By means of charts, the equivalent fluence is determined from the forward voltage.

The PIN diode is sensitive to fluences ranging from $2.10^{12}$ $n_{eq}/cm^2$ to $4.10^{14}$ $n_{eq}/cm^2$. It is however possible to extend this fluence range up to $6.3.10^{15}$ $n_{eq}/cm^2$, by injecting a current lower than 1 mA, to the detriment of the detection sensitivity.

For future experiments of the LHC, it is expected to reach still higher fluences, ranging up to $10^{17}$ $n_{eq}/cm^2$. Such a radiation level would correspond to the level currently encountered in nuclear power plants. For such fluences, conventional dosimeters are no longer adapted. Indeed, the voltage response of PIN diodes saturates, which makes it impossible to read the diode.

SUMMARY OF THE INVENTION

A need therefore exists to provide a method for measuring high radiation levels with a good sensitivity.

This need tends to be satisfied by providing the irradiation of a capacitive element provided with an electrode made from semiconductor material, the measurement of the capacitance of the capacitive element in accumulation regime, and the determination of the dose related to the non-ionizing effects of a particle radiation from the measurement of the capacitance of the capacitive element in accumulation regime.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT

The inventors have observed that the capacitance of a capacitive element in accumulation regime varies according to the dose related to the non-ionizing effects of a particle radiation. The capacitance varies continuously and monotonically up to high fluences, on the order of $10^{17}$ $n_{eq}/cm^2$. It is here provided apply this observation to form a high-performance non-ionizing radiation dosimeter.

Figure 1:
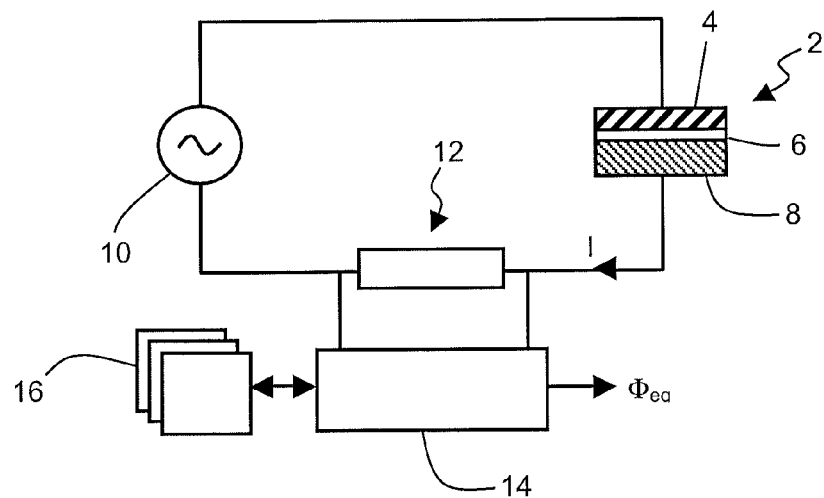
FIG. 1 shows a device for measuring a non-ionizing radiation dose, provided with a capacitive element.

FIG. 1 represents a non-ionizing radiation dosimeter provided with a capacitive element 2. Capacitive element 2 comprises a metal or polysilicon electrode 4 (gate), a dielectric layer 6 ($SiO_2$, $Si_3N_4$, $HFO_2$, $Ta_2O_5$ . . . ), and an electrode 8 made from semiconductor material, for example, a silicon substrate. The capacitive element preferably is a capacitor of MOS type: metal/oxide/semiconductor.

The dosimeter further comprises an A.C. voltage generator 10 connected to the terminals of element 2, that is, to electrodes 4 and 8, and a circuit 12 for measuring current I flowing through element 2. Circuit 12 is connected to a calculator 14 which determines the capacitance of element 2 in accumulation mode from the value of the current. Calculator 14 then determines the radiation dose $\Phi_{eq}$ corresponding to the capacitance value, for example, by means of a table 16 or chart.

Generator 10, measurement circuit 12 and calculator 14 (table 16 being able to be integrated to calculator 14) may form a single device, for example, an semiconductor parameter analyzer.

By definition, the accumulation regime corresponds to a bias state of the capacitive element where the majority charge carriers of the substrate (electrons in an n-type substrate and holes in a p-type substrate) are attracted towards the dielectric/semiconductor interface.

To determine the dose, the capacitance of the capacitive element in accumulation regime is first measured. Such a measurement may be carried out during the irradiation or after the irradiation, for example, by acquisition of the C-V curves of the capacitive element. The capacitance measurement may be carried out at high frequency as well as at low frequency.

Figure 2:
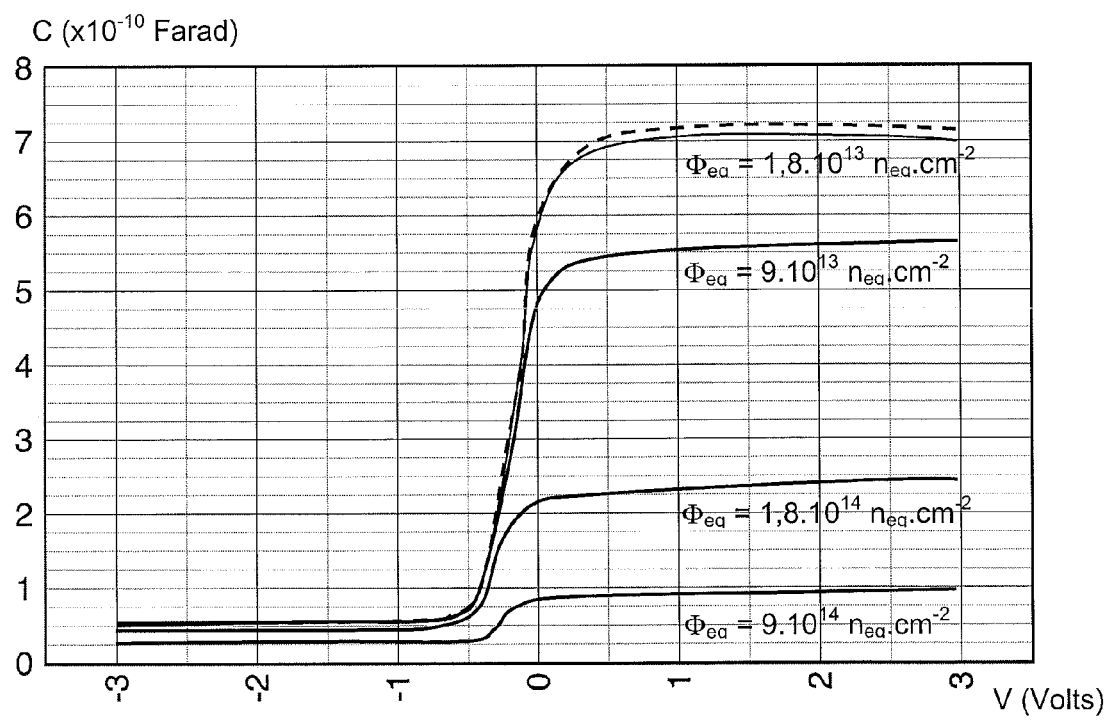
FIG. 2 is a graph of capacitance C of the irradiated capacitive element versus voltage V applied thereacross, for several radiation levels $\Phi_{eq}$.

FIG. 2 represents an example of plotting of capacitance C of a reference capacitive element versus voltage V applied thereacross, for different radiation levels. The curve in dotted lines shows the capacitance of the non-irradiated capacitive element. The operating conditions are the following:

The capacitive element is irradiated by a flow of protons charged at 1.8 MeV.

The proton fluence varies between $10^{12}$ cm$^{-2}$ and $5.10^{13}$ cm$^{-2}$, which corresponds to an equivalent fluence ranging between $1.8.10^{13}$ n$_{eq}$/cm$^2$ and $9.10^{14}$ n$_{eq}$/cm$^2$ (conversion factor k on the order of 17.9).

The gate of the capacitive element is made of polysilicon, the silicon dioxide dielectric layer has a 7-nm thickness, and the silicon substrate is n-type doped. Its doping level is equal to $10^{15}$ cm$^{-2}$.

The substrate thickness is 540 μm and the surface area of the capacitive element is equal to 500×500 μm$^2$.

The substrate is grounded during the exposure to radiations.

For each equivalent fluence $\phi_{eq}$, capacitance C reaches a maximum value $C_M$ for positive voltages V. In the case of an n-type capacitive element, that is, an element formed on an n-type doped substrate, these voltages correspond to a accumulation mode. It can thus be observed that the capacitance value in accumulation regime, $C_M$, decreases as fluence $\phi_{eq}$ increases.

To explain this phenomenon, the inventors have calculated, for each proton fluence, the equivalent X-ray dose. X rays are exclusively ionizing. They have then exposed a capacitive element (identical to that previously described) to such X-ray doses, and have observed no modification of the capacitance of the capacitive element.

The decrease of capacitance $C_M$ would thus seem to be due to a non-ionizing dose effect only. Now, a non-ionizing radiation is characterized by a displacement of atoms in the substrate, which decreases the mobility of charge carriers and their lifetime. This results in increasing the substrate resistivity.

Thus, the decrease in capacitance $C_M$ may be imputed to a parasitic resistance of the substrate, which increases along with the radiation dose. The following model, taken from article ["Note on the analysis of C-V curves for high resistivity substrates", Estrada Del Cueto, Solid-State Electronics, 39(10), p. 1519, 1996] allows to obtain the relation between capacitance $C_M$ measured by the dosimeter and this resistance.

In accumulation regime, the capacitance associated with the substrate can be neglected. The capacitive element can then be modeled in the form of an oxide capacitance $C_{OX}$ and of a substrate resistance $R_S$ in series. Capacitance $C_{OX}$ varies according to the nature and to the thickness of the oxide. In the above example, the theoretical value of capacitance $C_{OX}$ is equal to 1200 pF.

This model has also been used in article ["High-energy proton irradiation effects on tunnelling MOS capacitors", Fleta et al., Microelectronics Engineering, 72, pp. 85-89, 2004]. The author highlights the appearance of a series resistance during the exposure of a MOS capacitance to a proton flow. However, he explains it by a degradation of the backside contact of the substrate, and not by an increase in the substrate resistivity since the series resistance is independent from the capacitance surface area.

With this model, current I flowing through the capacitive element during the measurement of capacitance $C_M$ is given by the following relation:

$$I = \frac{jC_{OX}\omega}{1 + jR_S C_{OX}\omega} V_{AC}, \quad (1)$$

$V_{AC}$ being the amplitude of the A.C. signal applied to the gate by the measurement device and ω its angular frequency.

The imaginary part of the current is then written as:

$$\text{Im}[I] = jC_{OX}\omega \frac{V_{AC}}{1 + R_S^2 C_{OX}^2 \omega^2}. \quad (2)$$

This provides the relation between the capacitance measured in accumulation regime $C_M$ and series resistance $R_S$:

$$C_M = \frac{C_{OX}}{1 + R_S^2 C_{OX}^2 \omega^2}. \quad (3)$$

Based on the curves of FIG. 2, it is possible to create a chart of accumulation capacitance $C_M$ versus non-ionizing radiation dose $\Phi_{eq}$.

Figure 3:
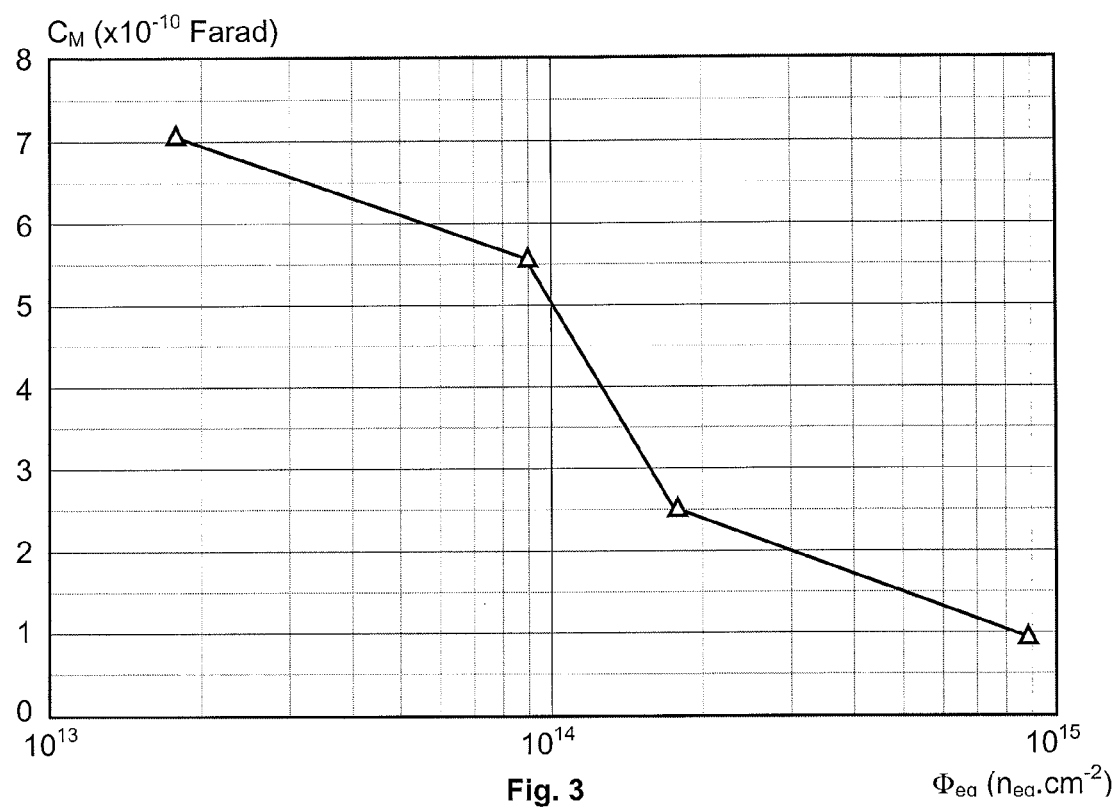
FIG. 3 is a chart of capacitance C versus equivalent fluence $\Phi_{eq}$.

FIG. 3 represents such a chart. After the measurement of capacitance $C_M$, the reading of the chart enables to determine the corresponding dose $\Phi_{eq}$ accumulated in the capacitive element.

The variation of capacitance $C_M$ of a capacitive element according to the non-ionizing radiation dose may be established for fluences approximately ranging between $5.10^{12}$ n$_{eq}$/cm$^2$ and $10^{16}$ n$_{eq}$/cm$^2$. The lower and higher detection limits may vary according to the nature and to the dimensions of the capacitive element, and especially according to its surface area. Thus, the capacitive element enables to measure high radiation levels, such as those encountered in nuclear power plants.

Figure 4:
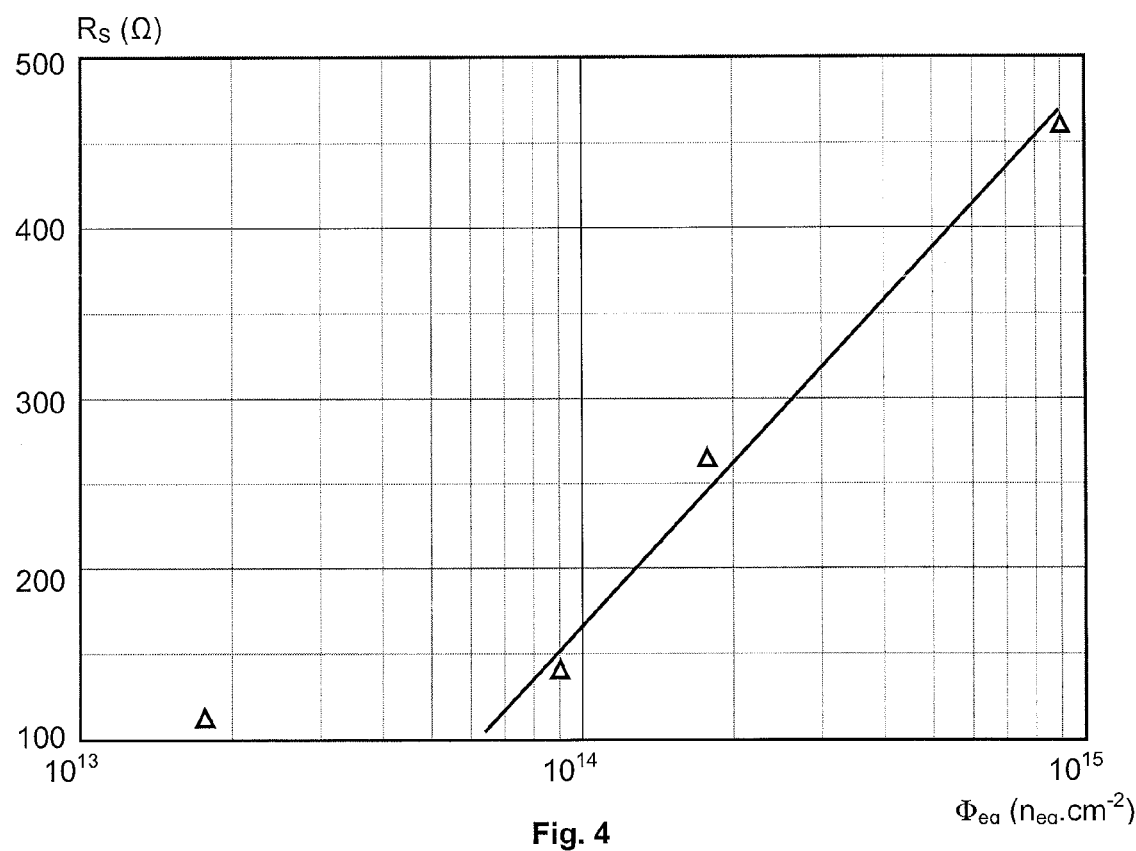
FIG. 4 is a chart of parasitic resistance $R_S$ of the substrate versus equivalent fluence $\Phi_{eq}$.

FIG. 4 represents a second chart that may be used to read the dose. This chart links series resistance $R_S$ to equivalent fluence $\phi_{eq}$. It has been obtained by calculating the value of resistance $R_S$ from relation (3) and from the values of capacitance $C_M$ of FIG. 2. It should be observed that series resistance $R_S$ varies linearly with the fluence, starting from a detection threshold. This threshold is approximately $7.10^{13}$ n$_{eq}$/cm$^2$ in the example of FIG. 4.

The response of the capacitive element is generally linear, which makes it easier to read the dosimeter and increases the reliability thereof. The MOS capacitive element is a usual microelectronics component. The dosimeter is thus easy to form. Conversely to a PIN diode, the MOS capacitive element enables to measure high fluences while keeping a good sensitivity, of approximately $20.10^9$ cm$^{-2}$.Ω (fluence per series resistance unit).

Many variants and modifications of the dosimeter will occur to the person skilled in the art. Indeed, the dosimeter is not limited to a specific capacitive element structure. The capacitive element may especially be formed on semiconductor substrates of various natures, for example, made of germanium or of silicon-germanium alloy, n-type or p-type doped.

The invention claimed is:

1. A method for measuring a dose related to the non-ionizing effects of a particle radiation, comprising the steps of:
   irradiating a capacitive element provided with an electrode made from a semiconductor material;
   measuring the capacitance of the capacitive element in accumulation regime; and
   determining the dose related to non-ionizing effects from the measurement of the capacitance of the capacitive element in accumulation regime.

2. The method according to claim 1, comprising the steps of:
   initially building a chart linking the capacitance to the dose related to non-ionizing effects, by means of a reference capacitive element submitted to different radiation levels;
   reading the chart to determine the dose related to non-ionizing effects.

* * * * *